A. C. MASON & A. T. STURT.
SPRING SUSPENSION.
APPLICATION FILED JAN. 9, 1915.
1,166,616.
Patented Jan. 4, 1916.
3 SHEETS—SHEET 2.
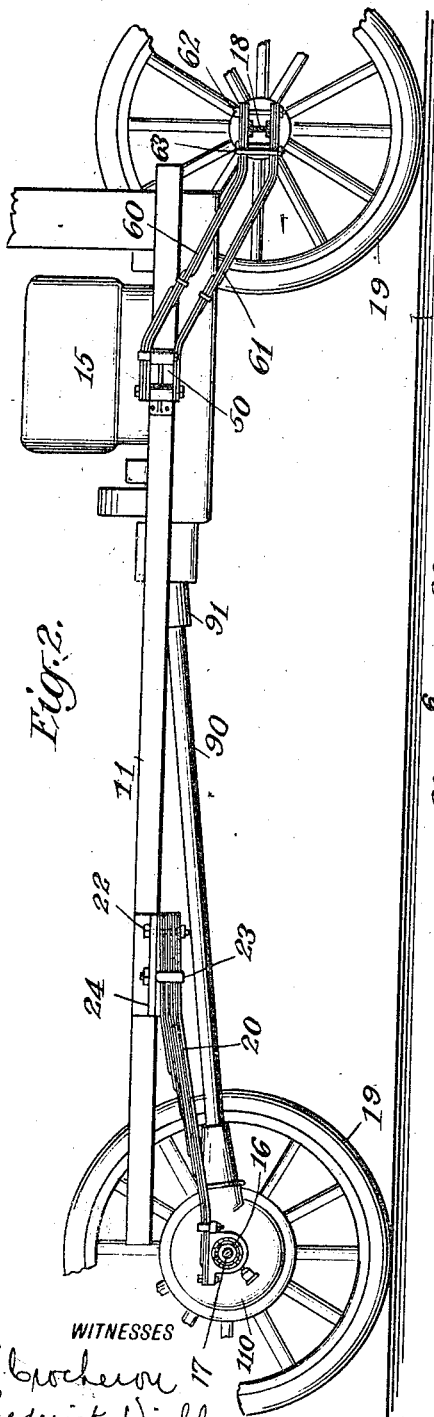
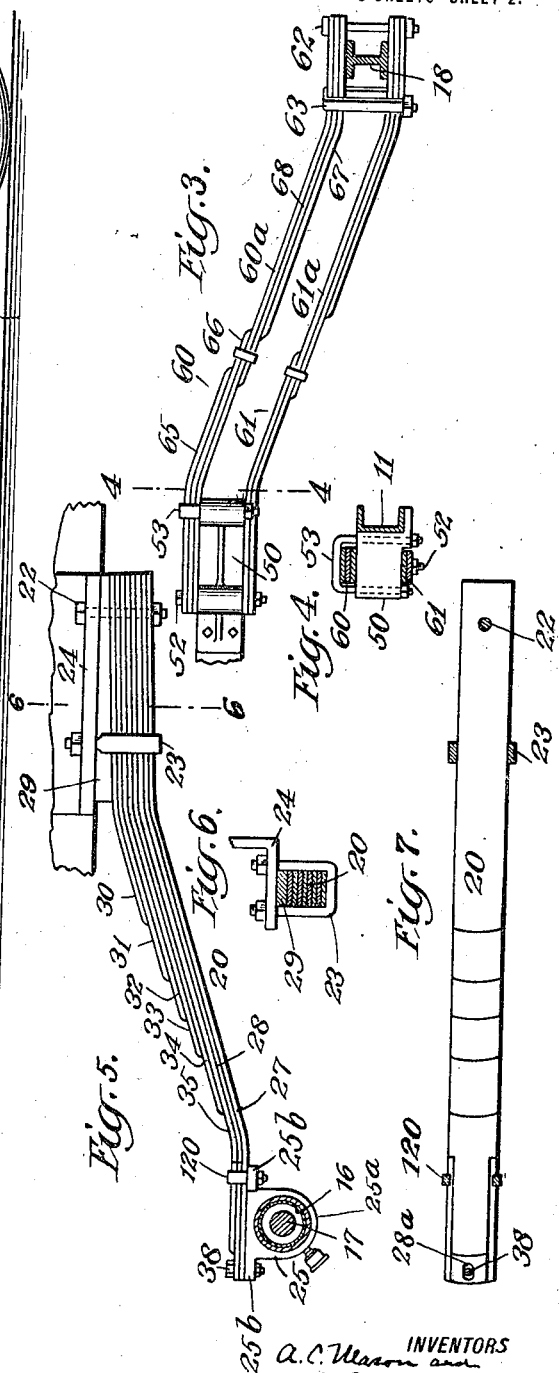

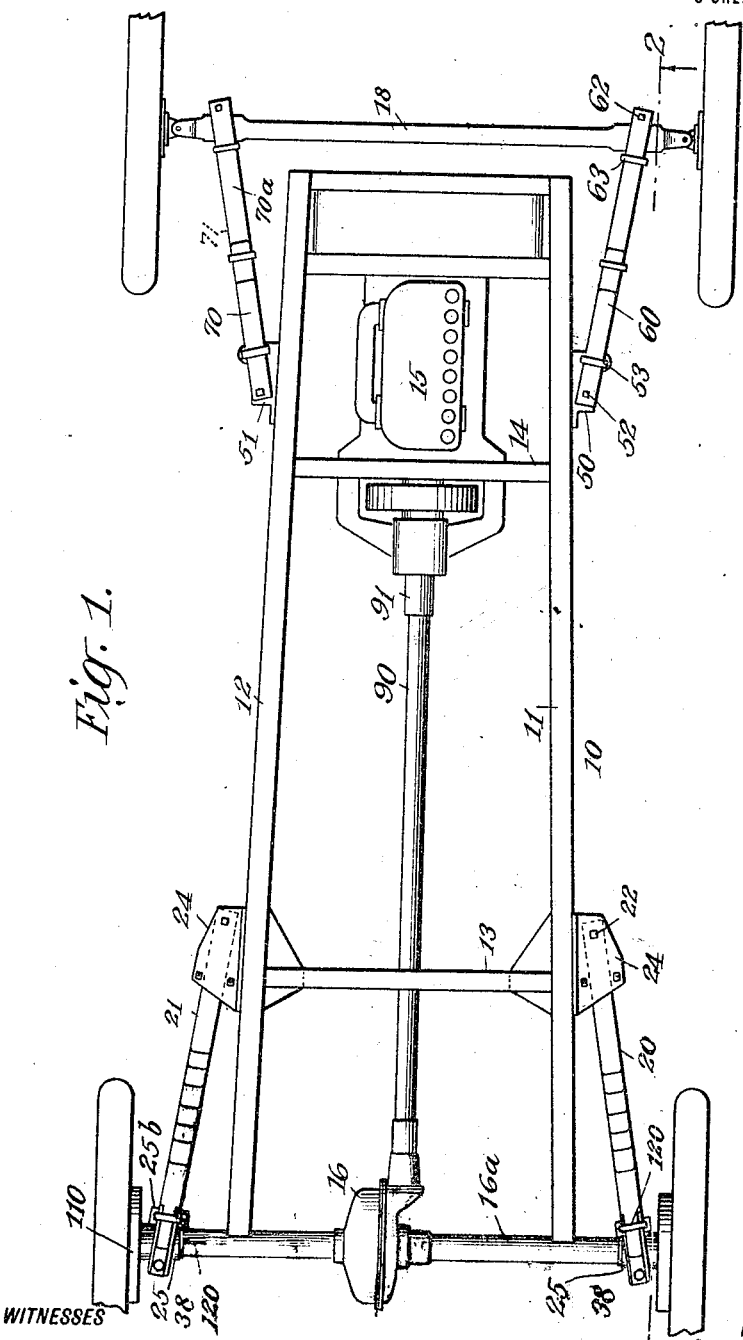

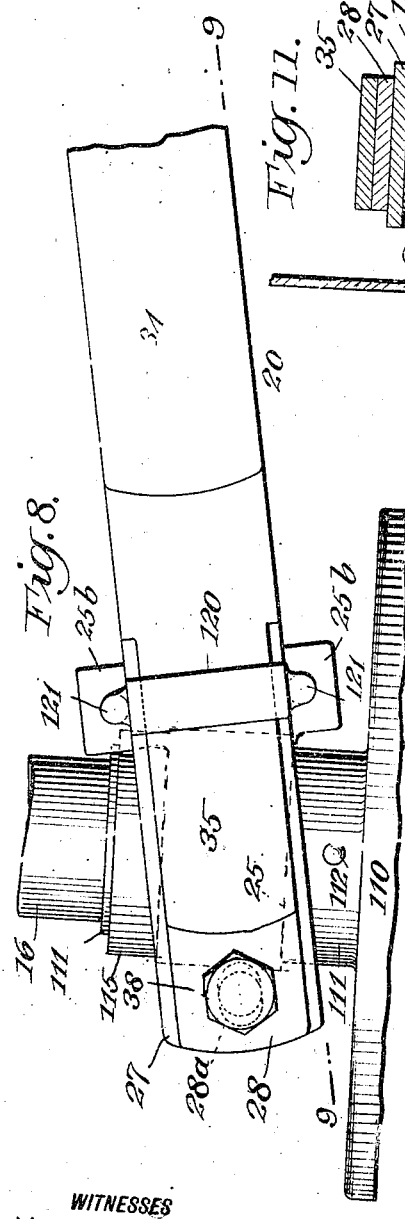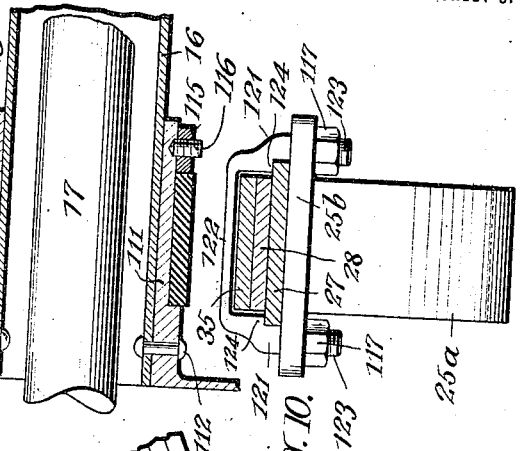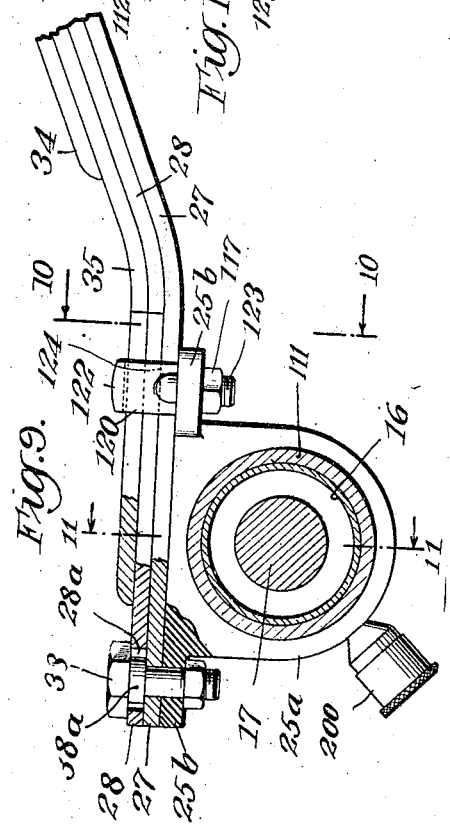

UNITED STATES PATENT OFFICE.

ARTHUR C. MASON AND ALFRED T. STURT, OF FLINT, MICHIGAN, ASSIGNORS TO CHEVROLET MOTOR COMPANY OF NEW YORK, INC., OF NEW YORK, N. Y., A CORPORATION OF NEW YORK.

SPRING SUSPENSION.

1,166,616.

Specification of Letters Patent. Patented Jan. 4, 1916.

Application filed January 9, 1915. Serial No. 1,270.

*To all whom it may concern:*

Be it known that we, ARTHUR C. MASON and ALFRED T. STURT, citizens of the United States of America, and residents of the city of Flint, county of Genesee, State of Michigan, have jointly invented certain new and useful Improvements in Spring Suspension; and we do hereby declare the following to be a full, clear, and exact description thereof.

The invention relates to an improved arrangement and construction of springs for mounting the chassis upon the running gear of motor vehicles.

One of the objects of the invention is to provide an improved spring construction for attaching the chassis to the front axle of motor vehicles, the springs being so arranged and constructed that the bending moments of the springs will be applied to those portions of the springs which are strongest and the points of no deflection will be at the weaker portions of the springs.

Another object of the invention is to so mount the springs upon the frame and on the axles that the points of load and resistance will act in substantially parallel planes.

Another object is to so mount the forward springs with respect to each other on the front axle, as to prevent the front axle from turning on its axis.

Another object is to so mount the rear springs on the housing of the rear axle as to give the springs a free movement with respect to the housing, and at the same time provide a sufficient bending moment for the spring.

Other objects will appear from the subjoined description and claims.

The invention consists in the construction and combination of parts hereinafter more particularly described and claimed.

Referring to the drawings: Figure 1., is a plan view showing the running gear, the frame and the springs connecting the frame to the running gear, the body of the automobile being removed. Fig. 2., is a side view partly in section on line 2—2 of Fig 1. Fig. 3., is a side view of a pair of springs connecting the frame with the front axle as shown in Fig. 2. Fig. 4., is a section on line 4—4 of Fig. 3. Fig. 5., is a side view in detail of the rear spring shown in Fig. 2. Fig. 6., is a section on line 6—6 of Fig. 5. Fig. 7., is a plan view partly in section of the spring shown in Fig. 5. Fig. 8., is a plan view of one of the rear springs secured to the axle tube or housing. Fig. 9., is a side elevation partly in section taken on line 9—9 of Fig. 8. Fig. 10., is a section on line 10—10 of Fig. 9. Fig. 11., is a section on line 11—11 of Fig. 9.

In the drawings similar reference characters indicate like parts.

The supporting frame 10 is composed of side bars 11 and 12 and cross bars 13 and 14.

15 is a conventional engine and 16 is the differential gear housing on the rear axle 17.

The wheels 19 are secured to the front axle 18 and to the rear axle 17 in the usual way.

20 and 21 are rear springs fixedly secured by means of bolts 22 and U shaped clamps 23 respectively to the brackets 24 secured to the side bars of the automobile body supporting frame as shown. Wedge shaped blocks 29 may be placed between the brackets 24 and the upper portion of the rear springs. This construction is not necessary when the springs are so shaped as to fit snugly against the bottom of the brackets. The rear ends of each of these springs are fixedly secured to spring seats 25 consisting of sleeves 25$^a$ provided with flat perches 25$^b$ on the top of the sleeves. The sleeves 25$^a$ are so mounted as to have an axial movement about the axle tube or housing 16$^a$ which surrounds the rear axle 17.

The construction is as follows: The brake flange 110 is provided with a tubular sleeve 111 fitting over the axle tube or housing and secured thereto by rivets 112 or other suitable means. A journal 113 is formed at the outer end of the tubular sleeve in which the spring seat 25 is mounted so as to provide for an axial turning movement. The spring seat is held in place by a stop-collar 115 secured to the brake-flange sleeve 111 by any suitable means such as a set screw 116. The springs 20 and 21 may be described as sinuous in shape and consist of a plurality (preferably two) continuous spring plates and a series of secondary shorter spring plates held thereto one above the other. The pair of continuous spring plates are indicated by 27 and 28 and the secondary plates are indicated by the numerals 30, 31, 32, 33, 34 and 35 and each secondary plate differs from the other in length as shown. The rear end of the lower continuous spring 27 is fixedly secured by a bolt 38 to the perch 25ᵇ on the spring seat 25. The shank of the bolt 38 is enlarged near the head thereof at 38ᵃ so as to bite upon the lower continuous spring plate 27 and hold it to the spring seat. The length of the enlarged portion 38ᵃ of the bolt 38 is slightly greater than the thickness of the continuous spring plate 28. In the end of the spring plate 28 we provide a slot 28ᵃ of sufficient length through which the bolt 38 extends to insure a movement of the spring plate 28. A yoke 120 is also used to hold the rear of the spring plate 27 to the spring seat 25. This yoke is provided with arms 121 connected by a bridge piece 122, the ends of the arms being screw-threaded at 123 and shoulders are formed on the inner sides of both arms at 124. The arms 121 extend through holes in the perches 25ᵇ and the lower spring is clamped between the spring seat and shoulders 124 on the arms when the nuts 117 are screwed down as shown. There is a sufficient space provided between the bridge 122 and the shoulder 124 so as to permit the reciprocatory movement of the spring plate 28 and the spring plate 35. Springs of similar structure are mounted upon each side of the frame and similarly mounted upon the rotatable spring seats upon each brake flange as clearly shown in Figs. 1 and 2.

A suitable lubricating device 200 is provided for the spring seat.

Near the front end of the frame on each side thereof, we secure brackets 50 and 51 to each of which by means of bolts 52 and U shaped binding devices 53, are secured the upper ends of springs 60, 61, 70 and (71 not shown). The spring 60 is secured at the upper side of the bracket 50 and the spring 61 is secured at the underside of the bracket 50 and these springs extend parallel to each other forwardly and downwardly, being curved in two opposite directions, the forward end of the upper spring being fixedly secured to the front axle by means of bolts 62 and 63. The forward end of the lower spring is secured to the underside of the front axle at its outer end. The other pair of springs 70 and (71 not shown) are similar in shape and structure and parallel to each other and are similarly secured to the other side of the frame on the bracket 51 and the other end of the front axle. The front springs are sinuous in shape and each end of the continuous spring plates 60ᵃ, 61ᵃ, 70ᵃ and (71ᵃ not shown) are reinforced at their upper ends by plates 65 and 66 and at their lower ends by plates 67 and 68.

The front end of the propeller shaft housing 90 is carried as usual in a suitable sliding sleeve 91 which is in turn attached in the usual way to the frame 10 or other rigid portion of the car. In this construction, the springs are the distance pieces or drivers and are well adapted for this duty by reason of being placed on both sides of the longitudinal and continuous bars of the frame. The rear springs are so constructed as to provide for longitudinal movements between the parts thereof, and are so mounted as to provide for an axial turning about the rear axle housing to the end that the fixed parts are relieved from undue stress and strain and the construction acts as an effective shock absorber.

The springs at the front end of the motor vehicle near the front axle (which latter consists of a beam with king bolts at each end on which the wheels swing as shown in Fig. 1.) consisting of a parallel spring construction, as described, permit the necessary parallel motion for the requirements of both of the front axle king bolts and the correct working of these springs is thereby obtained. These springs also form distance pieces from the axle to the frame.

While we have shown certain features of our invention in the accompanying drawings, it is to be understood that said drawings are merely illustrative, and that we are not confined to what is there shown and herein described, in connection therewith, except as may be specifically set forth in the claims.

Having now described our invention, what we claim as new and desire to secure by Letters Patent, is:—

1. In an automobile, an axle, a frame over the axle, a sinuous spring fixedly secured at one end to the frame and rotatably secured at the other end to the axle casing.

2. In an automobile, a front axle and a rear axle, a frame over the axles, a housing for the rear axle, a rotatable sleeve mounted on the axle housing near the ends thereof, a telescopic rod connecting the axle housing to the frame, springs on each side of the frame, one end of each spring being fixedly secured to the frame and the other end fixedly secured to a rotatable sleeve, the position of the under side of each rear spring being so related to the position of the telescopic rod that the point of load and point of resistance will act in substantially parallel planes, springs fixedly secured at one end to the frame and at the other end to the front axle, as and for the purpose set forth.

3. In an automobile, the combination of an axle having a housing, a spring seat rotatably mounted in fixed positions on the axle housing, a supporting frame over the axle, a spring rigidly secured at each of its ends respectively to the frame and to the spring seat.

4. In an automobile, the combination of front and rear axles, a frame over the axles, a housing for the rear axle, a telescopic rod secured to the housing and frame, spring seats rotatably mounted on the axle housing, rearwardly projecting springs on each side of the frame fixedly secured at each end thereof, to the frame and a spring seat respectively, forwardly projecting springs, the ends of the springs of each pair being rigidly secured respectively to the frame, and to the front axle, as and for the purposes described.

5. The combination with an axle tube or housing, a spring seat rotatably mounted upon said housing and held from movement in the direction of its axis, a spring plate fixedly secured to the spring seat, a superposed spring plate held at one end to the first mentioned spring plate but adapted to slide thereon at the other end, secondary spring plates also adapted to have a sliding movement at one end with respect to the first mentioned spring plates and combined clamping and guiding means to clamp the first mentioned spring plate to the spring seat and to form guides for the other spring plates.

In witness whereof we have hereunto set our hands at the Borough of Manhattan, city and State of New York, this fifth day of January, 1915.

ARTHUR C. MASON.
ALFRED T. STURT.

In presence of—
S. E. NEILLER,
JOHN J. RANAGAN.